United States Patent
Carey et al.

(10) Patent No.: US 9,887,940 B2
(45) Date of Patent: *Feb. 6, 2018

(54) SELECTIVELY TRANSLATING PORTIONS OF ELECTRONIC MESSAGES

(71) Applicant: Facebook, Inc., Menlo Park, CA (US)

(72) Inventors: Charles A. Carey, Kirkland, WA (US); Bruce A. Robinson, Maple Valley, WA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/510,078

(22) Filed: Oct. 8, 2014

(65) Prior Publication Data

US 2015/0026283 A1 Jan. 22, 2015

Related U.S. Application Data

(63) Continuation of application No. 14/322,885, filed on Jul. 2, 2014, now Pat. No. 9,363,212, which is a
(Continued)

(51) Int. Cl.
*H04W 4/00* (2009.01)
*H04M 1/00* (2006.01)
(Continued)

(52) U.S. Cl.
CPC ............ *H04L 51/04* (2013.01); *H04L 51/066* (2013.01); *H04L 51/28* (2013.01); *H04L 51/38* (2013.01);
(Continued)

(58) Field of Classification Search
CPC ...................................................... H04L 12/58
(Continued)

(56) References Cited

U.S. PATENT DOCUMENTS 5,025,252 A 6/1991 DeLuca et al.
5,351,235 A 9/1994 Lahtinen
(Continued)

FOREIGN PATENT DOCUMENTS

EP 0889660 1/1999
EP 1071295 1/2001
(Continued)

OTHER PUBLICATIONS

U.S. Appl. No. 13/614,489, dated Mar. 27, 2015, Office Action.
(Continued)

*Primary Examiner* — Tilahun B Gesesse
(74) *Attorney, Agent, or Firm* — Keller Jolley Preece

(57) ABSTRACT

A method, system and computer program product for instant message communication in a wireless and non-wireless environment. A message is sent from a mobile unit device over a wireless communication network. The message includes a destination address, information associated with the mobile unit device's user, message content and message address. If, according to information previously stored for the mobile unit device's user at the instant message system, the destination address is associated with an instant message function, the associated instant message function is executed at the instant message system using the information contained in the message content, if required as determined by the associated instant message function. If, according to information previously stored for the mobile unit device's user at the instant message system, the destination address is associated with an instant message name, an instant message is created according to the message content and is sent to the user with the associated instant message name. For instant messages sent or received by a mobile unit device with known buddies, the instant message is optimized by tagging the instant message with a routing phone number that is
(Continued)

unique to the mobile unit device and buddy combination, whose identity is stored both in the mobile unit device address book and in the instant message routing server.

20 Claims, 11 Drawing Sheets

Related U.S. Application Data continuation of application No. 13/614,489, filed on Sep. 13, 2012, now Pat. No. 9,614,791, which is a continuation of application No. 13/226,171, filed on Sep. 6, 2011, now Pat. No. 8,660,614, which is a continuation of application No. 12/022,027, filed on Jan. 29, 2008, now Pat. No. 8,027,694, which is a continuation of application No. 10/795,500, filed on Mar. 8, 2004, now Pat. No. 7,324,826, which is a continuation of application No. 09/519,525, filed on Mar. 6, 2000, now Pat. No. 6,714,793.

(51) Int. Cl.
　　*H04B 1/38*　　　(2015.01)
　　*H04L 12/58*　　(2006.01)
　　*H04W 4/12*　　　(2009.01)
　　*H04W 88/18*　　(2009.01)
　　*H04M 1/725*　　(2006.01)

(52) U.S. Cl.
　　CPC ............ *H04M 1/725* (2013.01); *H04W 4/12* (2013.01); *H04W 88/184* (2013.01)

(58) Field of Classification Search
　　USPC .................................. 455/412.1, 414.1, 418
　　See application file for complete search history.

(56) References Cited

U.S. PATENT DOCUMENTS

| | | |
|---|---|---|
| 5,353,340 A | 10/1994 | Kunz |
| 5,436,960 A | 7/1995 | Campana, Jr. et al. |
| 5,438,611 A | 8/1995 | Campana, Jr. et al. |
| 5,459,458 A | 10/1995 | Richardson et al. |
| 5,479,472 A | 12/1995 | Campana, Jr. et al. |
| 5,487,100 A | 1/1996 | Kane |
| 5,557,320 A | 9/1996 | Krebs |
| 5,561,703 A | 10/1996 | Arledge et al. |
| 5,568,536 A | 10/1996 | Tiller et al. |
| 5,579,472 A | 11/1996 | Keyworth, II et al. |
| 5,590,133 A | 12/1996 | Billstrom et al. |
| 5,604,788 A | 2/1997 | Tett |
| 5,608,786 A | 3/1997 | Gordon |
| 5,625,670 A | 4/1997 | Campana, Jr. et al. |
| 5,631,946 A | 5/1997 | Campana, Jr. et al. |
| 5,678,179 A | 10/1997 | Turcotte et al. |
| 5,697,060 A | 12/1997 | Akahane |
| 5,706,211 A | 1/1998 | Beletic et al. |
| 5,726,984 A | 3/1998 | Kubler et al. |
| 5,742,668 A | 4/1998 | Pepe et al. |
| 5,793,762 A | 8/1998 | Penners et al. |
| 5,796,394 A | 8/1998 | Wicks et al. |
| 5,802,466 A | 9/1998 | Gallant et al. |
| 5,812,865 A | 9/1998 | Theimer et al. |
| 5,878,397 A | 3/1999 | Stille et al. |
| 5,903,726 A | 5/1999 | Donovan et al. |
| 5,940,379 A | 8/1999 | Startup et al. |
| 5,940,496 A | 8/1999 | Gisby et al. |
| 5,960,074 A | 9/1999 | Clark |
| 5,966,663 A | 10/1999 | Gleason |
| 5,970,122 A | 10/1999 | LaPorta et al. |
| 6,014,429 A | 1/2000 | LaPorta et al. |
| 6,067,529 A | 5/2000 | Ray et al. |
| 6,112,078 A | 8/2000 | Sormunen et al. |
| 6,115,605 A | 9/2000 | Siccardo et al. |
| 6,134,432 A | 10/2000 | Holmes et al. |
| 6,138,158 A | 10/2000 | Boyle et al. |
| 6,169,911 B1 | 1/2001 | Wagner et al. |
| 6,178,331 B1 | 1/2001 | Holmes et al. |
| 6,192,396 B1 | 2/2001 | Kohler |
| 6,212,175 B1 | 4/2001 | Harsch |
| 6,212,548 B1 | 4/2001 | DeSimone et al. |
| 6,237,027 B1 | 5/2001 | Namekawa |
| 6,243,759 B1 | 6/2001 | Boden et al. |
| 6,252,952 B1 | 6/2001 | Kung et al. |
| 6,256,381 B1 | 7/2001 | Donaghue, Jr. |
| 6,256,516 B1 | 7/2001 | Wagner et al. |
| 6,259,911 B1 | 7/2001 | Bims et al. |
| 6,282,435 B1 | 8/2001 | Wagner et al. |
| 6,301,609 B1 * | 10/2001 | Aravamudan ........... H04L 51/26 707/999.001 |
| 6,430,604 B1 * | 8/2002 | Ogle ..................... H04L 12/581 709/203 |
| 6,512,930 B2 | 1/2003 | Sandegren |
| 6,549,937 B1 | 4/2003 | Auerbach et al. |
| 6,564,261 B1 * | 5/2003 | Gudjonsson ........ H04L 12/1818 370/261 |
| 6,574,486 B1 | 6/2003 | Labban |
| 6,597,671 B1 | 7/2003 | Ahmadi et al. |
| 6,622,017 B1 * | 9/2003 | Hoffman .................. G06F 8/65 455/412.1 |
| 6,714,793 B1 | 3/2004 | Carey et al. |
| 6,731,308 B1 | 5/2004 | Tang et al. |
| 6,760,580 B2 | 7/2004 | Robinson |
| 6,760,754 B1 | 7/2004 | Isaacs et al. |
| 6,801,659 B1 | 10/2004 | O'Dell |
| 6,807,423 B1 | 10/2004 | Armstrong et al. |
| 6,917,813 B2 | 7/2005 | Elizondo |
| 6,920,478 B2 | 7/2005 | Mendiola |
| 6,947,396 B1 | 9/2005 | Salmi |
| 7,016,978 B2 | 3/2006 | Malik et al. |
| 7,020,849 B1 | 3/2006 | Chen |
| 7,072,941 B2 | 7/2006 | Griffin et al. |
| 7,088,990 B1 | 8/2006 | Isomursu et al. |
| 7,142,642 B2 | 11/2006 | McClelland et al. |
| 7,146,404 B2 | 12/2006 | Kay et al. |
| 7,272,378 B2 | 9/2007 | Petry et al. |
| 7,324,826 B2 | 1/2008 | Carey et al. |
| 7,366,529 B2 | 4/2008 | Alanara et al. |
| 7,461,378 B2 | 12/2008 | Beyda |
| 7,584,257 B2 | 9/2009 | Isaacs et al. |
| 7,640,293 B2 | 12/2009 | Wilson et al. |
| 7,653,692 B2 | 1/2010 | Creamer et al. |
| 7,653,693 B2 | 1/2010 | Heikes et al. |
| 7,739,340 B2 | 6/2010 | Arenburg et al. |
| 7,805,487 B1 | 9/2010 | Isaacs et al. |
| 7,890,957 B2 | 2/2011 | Campbell |
| 7,945,249 B2 | 5/2011 | Fanelli et al. |
| 8,019,363 B2 | 9/2011 | Robinson |
| 8,027,694 B2 | 9/2011 | Carey et al. |
| 8,108,516 B2 | 1/2012 | Zmolek |
| 8,190,082 B2 | 5/2012 | Robinson |
| 8,195,193 B2 | 6/2012 | Li |
| 8,660,614 B2 | 2/2014 | Carey et al. |
| 8,755,828 B2 | 6/2014 | Carey et al. |
| 8,787,932 B2 | 7/2014 | Granito et al. |
| 9,203,794 B2 * | 12/2015 | Appelman ............. G06F 9/542 |
| 9,647,872 B2 * | 5/2017 | Appelman ........ H04L 29/08684 |
| 9,686,214 B2 * | 6/2017 | McLean ................ H04L 51/046 |
| 9,705,996 B2 * | 7/2017 | Oh ........................ H04L 67/18 |
| 9,720,565 B2 * | 8/2017 | Mandre ............... G06F 3/04817 |
| 9,736,209 B2 * | 8/2017 | Austin-Lane ........... H04L 67/02 |
| 9,749,276 B2 * | 8/2017 | Isaacs .................... H04L 51/22 |
| 9,760,568 B2 * | 9/2017 | Bill ...................... G06F 17/289 |
| 2001/0003202 A1 | 6/2001 | Mache et al. |
| 2001/0041579 A1 | 11/2001 | Smith et al. |
| 2002/0006803 A1 | 1/2002 | Mendiola et al. |
| 2002/0007398 A1 | 1/2002 | Mendiola et al. |
| 2003/0179930 A1 | 9/2003 | O'Dell et al. |
| 2004/0157586 A1 | 8/2004 | Robinson et al. |
| 2005/0055416 A1 | 3/2005 | Heikes et al. |
| 2005/0108341 A1 | 5/2005 | Mathew et al. |
| 2005/0176451 A1 | 8/2005 | Helferich |

(56) References Cited

U.S. PATENT DOCUMENTS

| | | |
|---|---|---|
| 2006/0117380 A1 | 6/2006 | Tachizawa et al. |
| 2006/0167986 A1 | 7/2006 | Trzyna et al. |
| 2013/0073653 A1 | 3/2013 | Heikes et al. |
| 2013/0078967 A1 | 3/2013 | Carey et al. |
| 2013/0084900 A1 | 4/2013 | Carey et al. |
| 2014/0315589 A1 | 10/2014 | Carey et al. |
| 2015/0113087 A1 | 4/2015 | Carey et al. |

FOREIGN PATENT DOCUMENTS

| | | |
|---|---|---|
| EP | 1091532 | 4/2001 |
| EP | 1102443 | 5/2001 |
| EP | 1104961 | 6/2001 |
| EP | 1104964 | 6/2001 |
| EP | 1104965 | 6/2001 |
| EP | 1113619 | 7/2001 |
| EP | 1113620 | 7/2001 |
| EP | 1113631 | 7/2001 |
| EP | 1113640 | 7/2001 |
| EP | 1113659 | 7/2001 |
| EP | 1113677 | 7/2001 |
| EP | 1011243 | 10/2001 |
| JP | 2000059422 A | 2/2000 |
| JP | 2003085996 | 10/2003 |
| JP | 2006026908 | 3/2006 |
| WO | 1998034422 | 8/1998 |
| WO | 1998047270 | 10/1998 |
| WO | 1999034628 | 7/1999 |
| WO | 2000042791 | 7/2000 |
| WO | 2000043892 | 7/2000 |
| WO | 2001041477 | 6/2001 |
| WO | 2001069406 | 9/2001 |
| WO | 2004111812 | 12/2004 |
| WO | 2004111871 | 12/2004 |

OTHER PUBLICATIONS

U.S. Appl. No. 14/586,771, dated Apr. 15, 2015, Office Action.
U.S. Appl. No. 13/614,489, dated May 10, 2016, Office Action.
U.S. Appl. No. 14/322,885, dated Feb. 22, 2016, Notice of Allowance.
U.S. Appl. No. 14/510,083, dated Apr. 14, 2016, Office Action.
U.S. Appl. No. 14/586,771, dated May 16, 2016, Office Action.
U.S. Appl. No. 13/614,489, dated Sep. 17, 2015, Office Action.
U.S. Appl. No. 14/322,885, dated Aug. 27, 2015, Office Action.
U.S. Appl. No. 14/510,083, dated Sep. 16, 2015, Office Action.
U.S. Appl. No. 14/586,771, dated Oct. 8, 2015, Office Action.
U.S. Appl. No. 13/614,489, dated Nov. 18, 2016, Notice of Allowance.
U.S. Appl. No. 14/510,083, dated Nov. 3, 2016, Office Action.
U.S. Appl. No. 14/510,083, dated Apr. 4, 2017, Notice of Allowance.
U.S. Appl. No. 14/586,771, dated Nov. 25, 2016, Notice of Allowance.
Anonymous: "Tegic Communications Extends Instant Messaging to Wireless Phones with Next Generation of T9 Text Input Software", Press Release, Jul. 27, 1999, XP002199725.
Business Information Corporation, Sep. 1, 1999, Atmobile.com Enters 'IM' World. 1 pg.
Business Wire, "Atmobile Awarded U.S. Patent Covering Key Elements of its Wireless Instant Messaging System", Sep. 13, 1999, 3 pgs.
Business Wire, AtMobile Develops Network-Sensing Instant Messaging, Dec. 9, 1999, Newsbyte, 3 pgs.
Cabrera, L. F. et al. Herald: Achieving a Global Event Notification Service; Microsoft Research, 5 pgs, retrieved on May 22, 2007.
Castelluccio, M. "E-mail in Real Time." Strategic Finance, Sep. 1999, 81:3, INSPEC abstract., 1 pg.
Cherry, S., "Talk is cheap, Text is Cheaper." IEEE Spectrum, May 2003, 1 pg.
Cherry, S., "IM Means Business" IEEE spectrum Nov. 2002., pp. 28-32, 5 pgs.
Dornan, A. "Instant Gratification [instant messaging]." Network Magazine, Aug. 2000, 15:8, INSPEC abstract, 1 pg.
Droms, R. "Dynamic Host Configuration Protocol." Network Working Group, Oct. 1993, 37 pgs.
Eschenburg A., "Wo Laufen Sie Denn? ICQ Haelt Verbindung Zu Bekannten", CT Magazin Fuer Computer Technik, Veral Heinz Heise GmBh, Hannover, DE, No. 22, Oct. 26, pp. 92-95, XP000779803, ISSN: 0724-8679, 5 pgs.
Examination Report received in1264413 dated Jan. 27, 2005, 6 pgs.
Fong, A.C.M. et al. "Towards an Open Protocol for Secure Online Presence Notification." Computer Standards and Interfaces, Sep. 2001, 23:4, INSPEC abstract, 1 pg.
Godefroid, P. et al. "Ensuring Privacy in Presence Awareness Systems: An Automated Verification Approach." 2000, CSCW '00 Proceedings of the 2000 ACM conference on Computer supported cooperative work, ACM New York, NY, USA, ISBN: 1-58113-222-0, 10 pgs, retrieved on May 22, 2007.
Hall, R. "The Event Desktop: Supporting Event-Enabled Clients on the Web." Freic University, Berlin, 12 pgs, retrieved May 22, 2007.
Handel, M. et al. "TeamPortal: Providing Team Awareness on the Web." 4 pgs, retrieved May 22, 2007.
Held, G. "Instant Messaging Finds its Voice." Network Magazine, May 2001, 16:5, INSPEC abstract, 1 pg.
International Search Report dated Feb. 2, 2007 as received in International Application No. PCT/US01/07306, 3 pgs.
Meola, M. "Real-time Reference Service for the Remote User: from the Telephone and Electronic Mail to Internet Chat, Instant Messaging, and Collaborative Software." Reference Librarian, 1999, abstract, 1 pg.
Milewski, A.E. et al. "Providing Presence Cues to Telephone Users." Proceedings of CSCW 2000. ACM Conf. on Computer Supported Cooperative Work, 2000, 9 pgs.
Mitsuoka, M. et al. "Instant Messaging with Mobile Phone to Support Awareness." Aug. 2001, 8 pgs.
Nardi, B. A. et al. "Interaction and Outeraction: Instant Messaging in Action." 2000, 10 pgs.
Nextel announces On-line paging service provided by wireless services-first wireless telephone messaging Service to Offer Delivery confirmation. NY Aug. 12, 1998, 2 pgs.
Office Action received in Canadian Application No. 2,400,807 dated Apr. 4, 2005, 4 pgs.
Okuyama, S. et al. "New Mobile Service Based on Instant Messaging Technology." Fujitsu, 2001, 52:3, INSPEC abstract, 1 pg.
Ortiz, S., Jr. "Instant Messaging: No Longer Just Chat." Computer, Mar. 2001, 34:3, INSPEC abstract, 1 pg.
Parviainen, R. et al. "Mobile Instant Messaging." IEEE, Jul. 3, 2003, 6 pgs.
Phillips Business Information corporation Aug. 23, 1999, Instant messaging has emerged as one of the most popular communication mediums in the world, 1 pg.
Postel, J. B. "Simple Mail Transfer Protocol." RFC788, Information Sciences Institute, Nov. 1981, 64 pgs.
Raman, B. et al. "Universal Inbox: Providing Extensible Personal Mobility and Service Mobility in an Integrated Communication Network." Proceedings Third IEEE Workshop on Mobile. Computing Systems and Applications, 2000, INSPEC abstract, 1 pg.
RCR Radio Communications Report, "InfoSpace offers instant messaging across networks", vol. 18, No. 47, p. 49; ISSN: 0744-0618, 2 pgs.
Riga, "Instant messaging takes off: Online chatting is the focus of war between Microsoft and America Online", The Gazette, Montreal, Quebec, Load Date Sep. 1, 1999, 5 pgs.
Schulzrinne, H. S. et al. "The IETF Internet Telephony Architecture and Protocols." IEEE Network, May-Jun. 1999, 6 pgs.
Supplementary Search Report received in1264413 dated Oct. 7, 2004.
Vittore, V. "The Next Dial Tone? [instant messaging]." TelephonyOnline, Oct. 16, 2000, 4 pgs.
Web www.jabber.com, Jabber, Inc., Jabber Wireless Gateway Overview, 2001, retrieved Apr. 21, 2007, 2 pgs.

(56) References Cited

OTHER PUBLICATIONS

Web www.yahoo.com, Yahoo! Messenger for Text Messaging, 2002, 1 pg.
U.S. Appl. No. 10/773,064, dated Apr. 5, 2007, Office Action.
U.S. Appl. No. 10/773,064, dated Oct. 9, 2007, Office Action.
U.S. Appl. No. 10/773,064, dated Aug. 3, 2009, Office Action.
U.S. Appl. No. 10/773,064, dated Jul. 6, 2010, Office Action.
U.S. Appl. No. 10/773,064, dated Dec. 27, 2010, Office Action.
U.S. Appl. No. 10/773,064, dated May 25, 2011, Notice of Allowance.
U.S. Appl. No. 10/795,500, dated May 15, 2007, Office Action.
U.S. Appl. No. 10/795,500, dated Sep. 14, 2007, Notice of Allowance.
U.S. Appl. No. 12/022,027, dated Dec. 10, 2010, Office Action.
U.S. Appl. No. 12/022,027, dated May 20, 2011, Notice of Allowance.
U.S. Appl. No. 13/226,171, dated Aug. 23, 2012, Office Action.
U.S. Appl. No. 13/226,171, dated Jun. 13, 2013, Notice of Allowance.
U.S. Appl. No. 13/226,171, dated Oct. 22, 2013, Notice of Allowance.
U.S. Appl. No. 13/614,443, dated Feb. 21, 2013, Office Action.
U.S. Appl. No. 13/614,443, dated Aug. 13, 2013, Notice of Allowance.
U.S. Appl. No. 13/614,443, dated Oct. 11, 2013, Notice of Allowance.
U.S. Appl. No. 13/614,465, dated Feb. 22, 2013, Office Action.
U.S. Appl. No. 13/614,465, dated Aug. 23, 2013, Office Action.
U.S. Appl. No. 13/614,465, dated Nov. 26, 2013, Office Action.
U.S. Appl. No. 13/614,465, dated Oct. 31, 2014, Notice of Allowance.
U.S. Appl. No. 13/614,489, dated Feb. 14, 2013, Office Action.
U.S. Appl. No. 13/614,489, dated Aug. 23, 2013, Office Action.
U.S. Appl. No. 13/614,489, dated Oct. 7, 2014, Office Action.
First Examination Report as received in Indian Patent Application No. 2694/KOLN/2008 dated Jul. 7, 2017.

* cited by examiner

SELECTIVELY TRANSLATING PORTIONS OF ELECTRONIC MESSAGES

This is a continuation of U.S. patent application Ser. No. 14/322,885, filed on Jul. 2, 2014, which is a continuation of U.S. patent application Ser. No. 13/614,489, filed on Sep. 13, 2012, which is a continuation of U.S. patent application Ser. No. 13/226,171, filed on Sep. 6, 2011, now issued as U.S. Pat. No. 8,660,614, which is a continuation of U.S. patent application Ser. No. 12/022,027, filed Jan. 29, 2008, now issued as U.S. Pat. No. 8,027,694, which is a continuation of U.S. patent application Ser. No. 10/795,500, filed Mar. 8, 2004, now issued as U.S. Pat. No. 7,324,826, which is a continuation of U.S. patent application Ser. No. 09/519,525, filed Mar. 6, 2000, now issued as U.S. Pat. No. 6,714,793, each of which is hereby incorporated by reference in their entirety.

BACKGROUND OF THE INVENTION

Around the world, tens of millions of users are using software that enables them to be alerted when friends, family and colleagues go on-line for the real-time exchange of messages. A commonly used term for this type of real-time exchange is instant messaging. Instant messaging is cheap, with most vendors giving away the product and others charging nominal licensing fees. It is also powerful, allowing users to communicate in one window while, for example, looking over a document in another. Team members in different locations can set up impromptu conversations, bouncing ideas and strategies off each other. It provides quick and dirty collaboration, with little to buy and not much to set up.

The best known instant messaging system is America Online's Instant Messenger (AIM) that was originally designed as a feature for AOL's pay service. AIM is software that anyone with an Internet connection can download, whether they are an AOL member or not. After registering a screen name, the user can maintain lists of AOL members and other AIM users, and be alerted whenever one of those in the list comes on-line. When one of those in the list comes on-line, the corresponding screen name appears in an AIM interface window on the screen. By clicking on the name appearing in the AIM interface window, the user may then send an instant message and initiate a conversation session. Users can also sort their buddies into groups. For example, a lawyer could create separate groups for partners, associates, in-house counsel and adversaries.

Other vendors, such as Yahoo, PeopleLink, Mirabilis (ICQ) and Activerse, offer similar instant message service.

Despite the apparent success of instant messaging systems, it is still limited to a user accessing the service through computer-based systems hardwired to the Internet. There exists a need to provide the benefits of instant messaging, immediate knowledge of another online status and real-time text communication, outside of hardwired Internet systems. Specifically in a wireless environment, it would be advantageous to know if a subscriber has turned on their cellular phone. It would also be advantageous to communicate via text messages, which are far less costly than voice communications because text message data uses up much less bandwidth or resources than voice data.

SUMMARY OF THE INVENTION

The present invention provides a method, system and computer program product for instant message communication in a wireless and non-wireless environment. First, a message is sent from a mobile unit device over a wireless communication network. The message includes a destination address, information associated with the mobile unit device's user, message content and message address. If, according to information previously stored for the mobile unit device's user at the instant message system, the destination address is associated with an instant message function, the associated instant message function is executed at the instant message system using the information contained in the message content, if required as determined by the associated instant message function. If, according to information previously stored for the mobile unit device's user at the instant message system, the destination address is associated with an instant message name, an instant message is created according to the message content and is sent to the user with the associated instant message name.

In accordance with another aspect of the present invention, if said instant message function is a sign on function, an instant message session is initiated according to prestored user profile information and the message content. The message content is an instant message name associated with the user of the mobile unit device and a predefined password.

In accordance with still another aspect of the present invention, the status information of users associated with instant message names stored for the user of the mobile unit device in the instant message system are determined and sent to the mobile unit device of the user. The user's mobile unit device then presents the sent status information.

In accordance with yet another aspect of the present invention, if said instant message function is a sign off function, the instant message session associated with the mobile unit device's user is ended.

In accordance with still yet another aspect of the present invention, if said instant message function is a delete instant message name function, the stored instant message is deleted according to the message content. The message content is at least one instant message name.

In accordance with still another aspect of the present invention, if said instant message function is an update instant message name function, the status information of users associated with instant message names stored for the user of the mobile unit device in the instant message system are determined and sent to the mobile unit device of the user. The user's mobile unit device then presents the sent status information.

In accordance with further aspects of the present invention, an instant message name is associated with a destination address at the instant message system. This association is saved in memory in the instant message system according to a registered user of a mobile unit device. An executable address loading program is generated according to the saved association and then sent through the wireless environment to the mobile unit device of the registered user. At the mobile unit device the executable address loading program is executed, thereby entering the associated instant message name and address into memory.

In accordance with still further aspects of the present invention, an instant message is processed according to sender user information stored at the instant message system if it is intended for a recipient user signed on through a mobile unit device and then sent through the wireless environment to the mobile unit device of the recipient user. The user's mobile unit device presents the sent instant message and the instant message name of the creator of the instant message.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
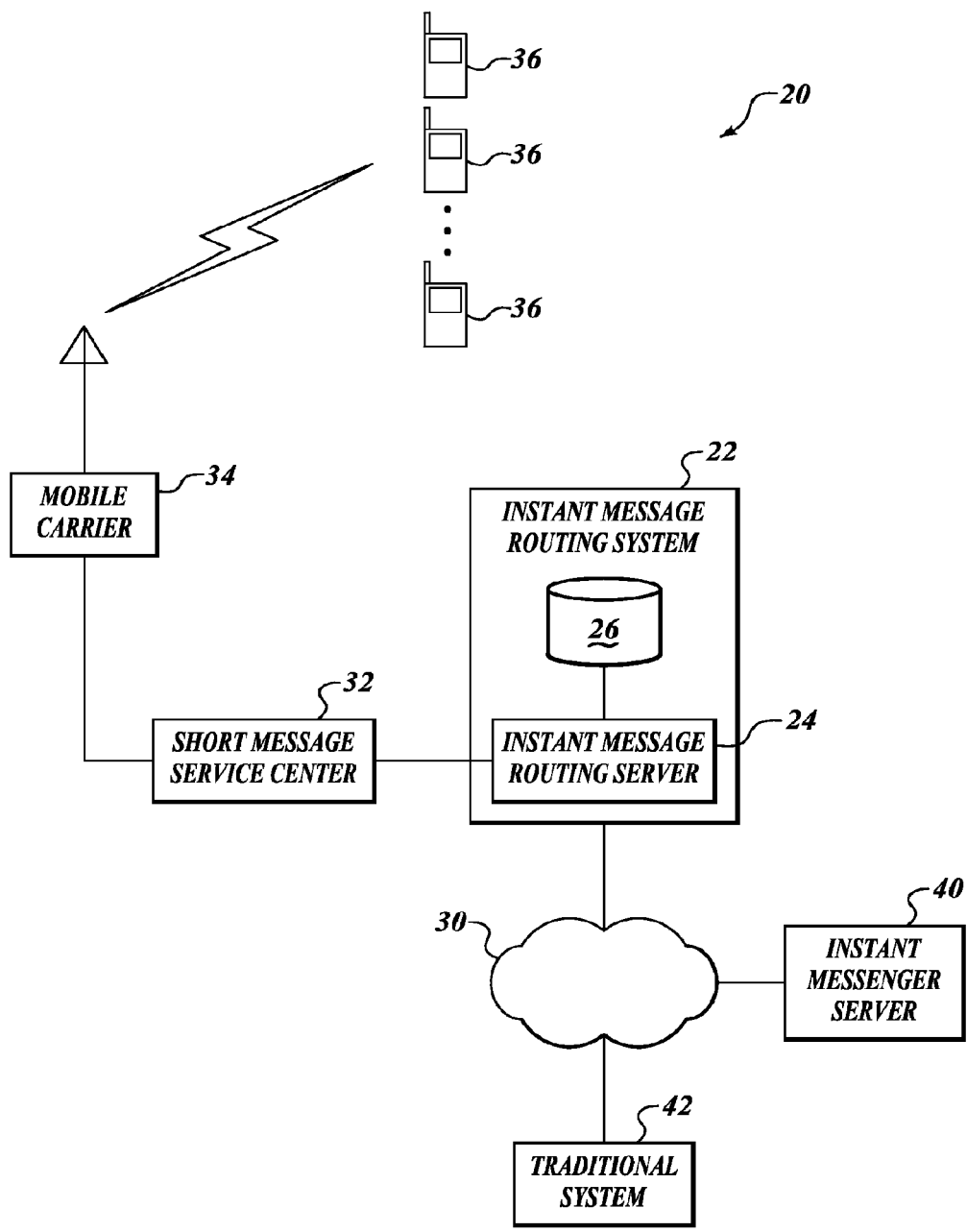
FIG. 1 is a block diagram of the components of the present invention.

The present invention is an integrated wireless and traditional instant messaging system and method. As shown in FIG. 1, the system 20 includes a instant message routing system 22 that includes a routing server 24 and a database 26 for storing a profile for each subscribing user. Each user profile includes a list of instant message names with each name assigned to an address (phone number). The routing server 24 is in communication with one or more short message service centers (SMSC) 32 that is in communication with one or more wireless mobile carriers 34. Each wireless mobile carrier 34 supports subscribing users operating mobile unit devices 36, such as a hand-held cell phone, a bag phone or a vehicle phone. The routing server 24 is also coupled to a public or private data network 30, such as the Internet. Also coupled to the public or private data network 30 are an instant message server 40 and one or more traditional systems 42, such as a personal computer.

The communication link between the routing server 24 and the short message service center 32 is also either a public or private data network, such as the Internet or a private dedicated circuit. A protocol residing over the communication link defines the structure of information communicated between the routing server 24 and the short message service center 32. Preferably this link is the Internet with TCP/IP operating thereon. Operating over TCP/IP is another protocol that allows the routing server 24 to identify the effectiveness of communications to the mobile unit devices 36. An example protocol residing over TCP/IP is the short message peer-to-peer (SMPP) protocol or configuration or data management procedure (CDMP) protocol. These protocols provide visibility of the status of message deliveries to the mobile unit devices 36.

A data bearer protocol defines the structure of data messages communicated between the mobile unit devices 36, the mobile carrier 34 and the short message service center 32. The global system for mobile communications (GSM) environment, used as the primary digital wireless standard throughout Europe, uses the short message service (SMS) standard data bearer protocol for formatting data for delivery between the mobile unit devices 36, wireless mobile carrier 34 and the short message service center 32. The SMS protocol describes the format of data, called SMS packages, sent or received through the system. In accordance with the present invention, the format of data messages, i.e. SMS package, sent from the mobile unit device includes the phone number of the mobile unit device, a destination phone number, the short message service center address (preferably a number), a validity period value and message content. The validity period value informs the short message service center 32 how long to attempt delivery. Each data message (SMS package) is preferably a single block of information. As can be readily appreciated by those of ordinary skill in the art of wireless communication, the SMS package may be divided up into multiple packets of data and sent at various intervals.

Figure 2:
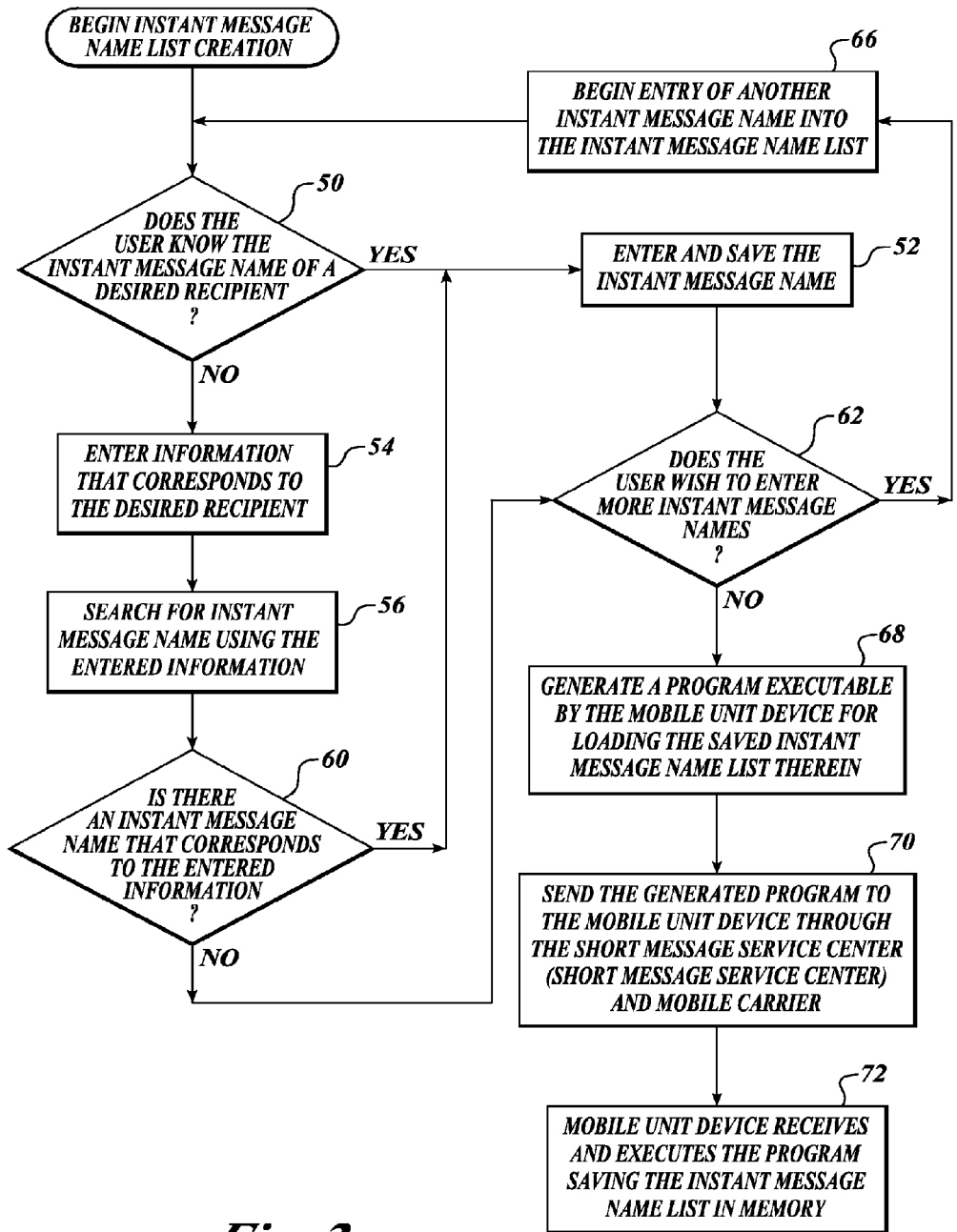
FIG. 2 is a flow diagram of a process of entering instant message names formed in accordance with the present invention.
Figure 3:
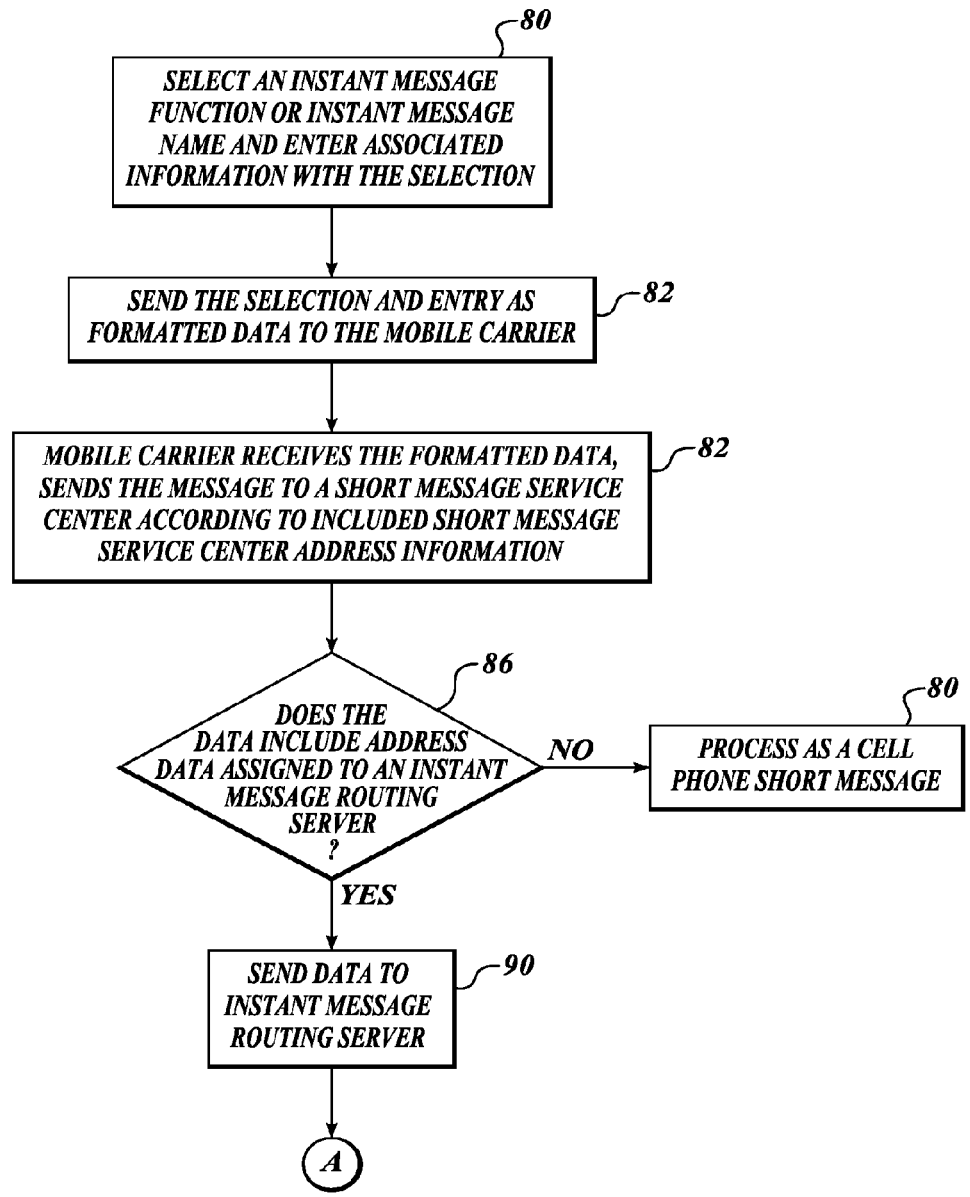
FIGS. 3-7 are flow diagrams of the formed in accordance with the present invention.

FIG. 2 illustrates a method for remotely creating an instant message name list for a cellular phone. First, a user, who is a subscriber to a wireless instant message service, uses a traditional system 42 coupled to the network 30 to sign on to a web site supported or generated by the routing server 24. A user becomes a subscriber by completing a registration process that can be performed during online communication with either servers 24 or 40 or through other means, such as e-mail, conventional mail or telephonic communication. Once the user has entered into the routing server's web site by preferably completing a sign-on or logon with password verification, the user begins instant message name list (i.e. buddy list) creation for the user's mobile unit device 36. If the cell phone user knows the instant message name that corresponds to a desired recipient, decision block 50, the user enters the instant message name. The entered instant message name is then saved in a look-up table at a location in the database 26, block 52. The look-up table is stored in relation to predefined user profile information. Each instant message name stored in the look-up table has a corresponding destination address, preferably a phone number. For example, the routing server 24 receives from the mobile carrier 24 or a telecommunications controlling agency a set of n telephone numbers. In the database 26 for each user profile, the server 24 associates a number from the set of n telephone numbers to an entered instant message name. As a result, the routing system 22 reuses a limited number of phone numbers.

If the cell phone user does not know the instant message name that corresponds to a desired recipient, decision block 50, the user enters information that corresponds to the desired recipient, such as an e-mail address, block 54. The server hosting the name list creation website then searches for an instant message name that corresponds to the entered information, block 60. If, at decision block 60, there is a corresponding instant message name, the corresponding instant message name is entered and saved, see block 52 above. If, at decision block 60, the search fails to find a corresponding instant message name, no name entry occurs and the user is given the opportunity to enter more instant message names, decision block 62. The user is also given the opportunity to enter more instant message names, decision block, after block 52.

If, at decision block 62, the user does not wish to enter more instant message names, a program is generated by the server hosting the name list creation website for programming the created instant message name list into the user's mobile unit device 36, block 68. Next, at block 70, the generated program is sent through the short message service center 32, where it is formatted according to the proper protocol, and then through the mobile carrier 34 to the user's mobile unit device 36. At block 72, the user's mobile unit device 36 receives and executes the program, thus saving the instant message name list in an address book stored in memory. In other words, the mobile unit device is programmed in an over-the-air-programming manner to include the instant message name list within the mobile unit device's instant message listings (i.e. address book).

In an alternative embodiment, if the mobile carrier 34 and corresponding mobile unit devices 36 do not include the hardware or software components for receiving and executing the program for loading the saved instant message name list, the loading of instant message names and corresponding phone numbers that are stored at the routing system 22 are manually entered into the address book of the user's mobile unit device 36.

FIGS. 3-7 illustrate the process of instant message function delivery, message delivery and instant message reception using a mobile unit device across a wireless and non-wireless network. First, at block 80 of FIG. 3, through a user interface on the mobile unit device 36 the user selects an instant message function or an instant message name(s) from the mobile unit device's address book based on the latest stored instant message name status information received from the instant message name routing server 24 as a result of a sign on, a status update or the last communication with the instant message routing server 24 (see FIG. 5 below). Then, the user enters message content information (either function related information or a message accordingly). Alternatively, the message content information is entered first, then an instant message function or an instant message name is selected. Examples of user interaction with the instant message routing server 24 and with the mobile unit device 36 are illustrated by example in FIGS. 8-14 below. Next, at block 82, the user's selection and entered information is formatted according to the predefined protocol and sent to the mobile carrier 34. At block 84, the mobile carrier 34 receives the formatted data and sends the formatted data to a short message service center 32 according to the included short message service center address information. At decision block 86, the short message service center 32 determines if the received formatted data includes address data assigned to an instant message routing server 24, i.e. an address field or phone number. If the formatted data does not include address data assigned to an instant message routing server 24, the formatted data is probably an email message and is processed according to known cellular Short Message processing methods, block 88. Also commonly referred to as email for cell phones. If the formatted data does include address data assigned to an instant message routing server 24, the formatted data is reformatted according to the predefined protocol used to communicate information between the short message service center 32 and the instant message routing server 24 and then sent to the instant message routing server 24, block 90.

Figure 4:
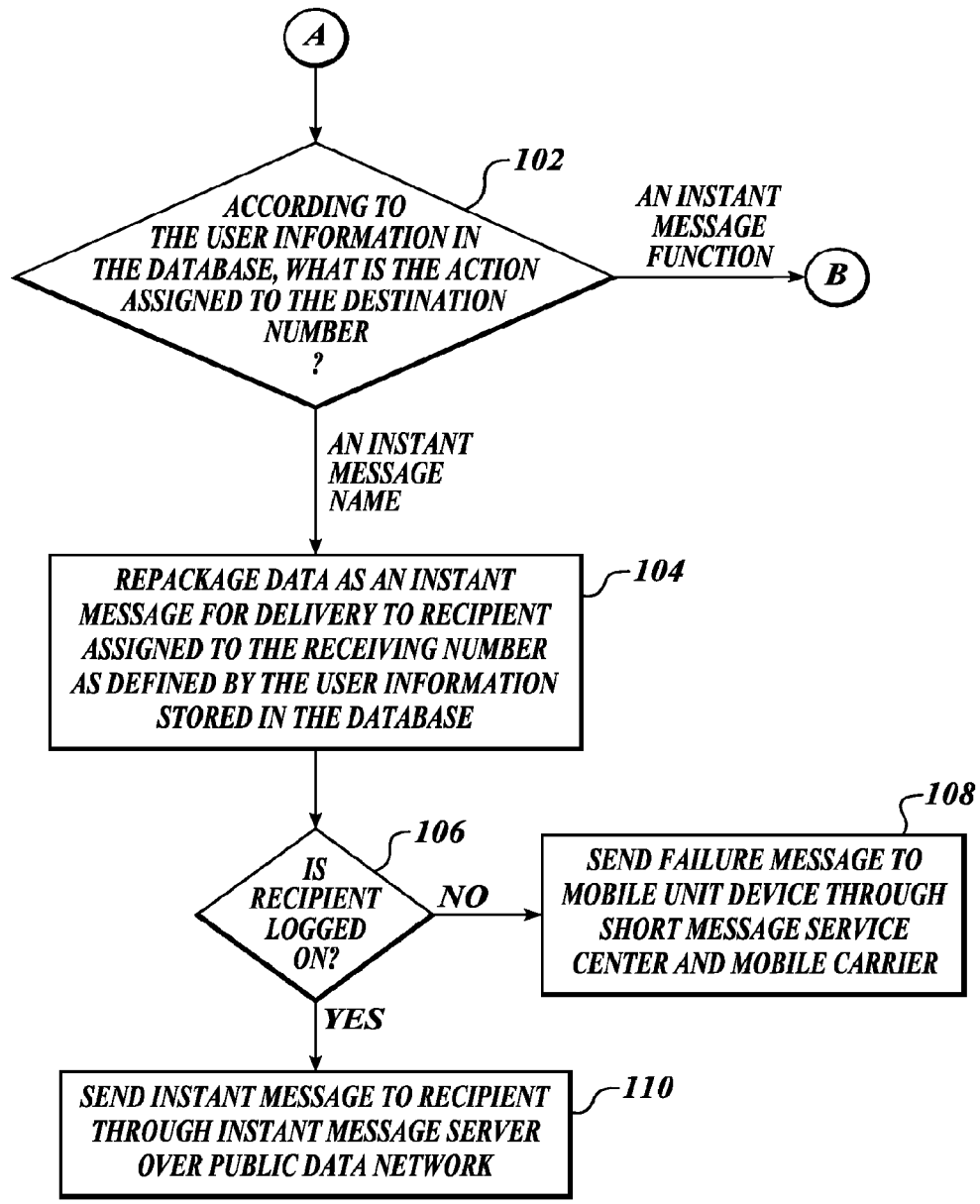

As shown in FIG. 4, at decision block 102, the instant message routing server 24 compares the destination number included in the reformatted data to the look-up table in the user profile location in the database 26 that corresponds to the mobile unit device phone number included with the received data. The comparison determines what action corresponds to the destination number. If the action corresponding to the destination number is an instant message function, the instant message routing server 24 executes the instant message function, see FIG. 5 below. If the action corresponding to the destination number is an instant message name, the instant message routing server 24 repackages the formatted data as an instant message and sends it to the recipient associated with instant message name, block 104. Before or after the repackaging occurs, the instant message routing server 24 determines if the recipient that corresponds to the instant message name is signed on to the instant message system, i.e. the instant message server 40, decision block 106. If the recipient is not signed on, the instant message routing server 24 sends a failure message to the user's mobile unit device 36 through the short message service center 32 and mobile carrier 34, block 108. In a first alternate embodiment, if the recipient is not signed on, the instant message server 40 stores the instant message until the instant message server 40 detects that the recipient has signed on through an instant message routing server 24 or a traditional system 42. In a second alternate embodiment, if the recipient is not signed on, the instant message is forwarded to a previously designated e-mail address.

If the recipient is signed on, the instant message routing server 24 sends the instant message to the recipient through the instant message server 40 over the network 30, block 110. The process of sending an instant message to a mobile unit device recipient is described in more detail below in FIGS. 6 and 7.

Figure 5:
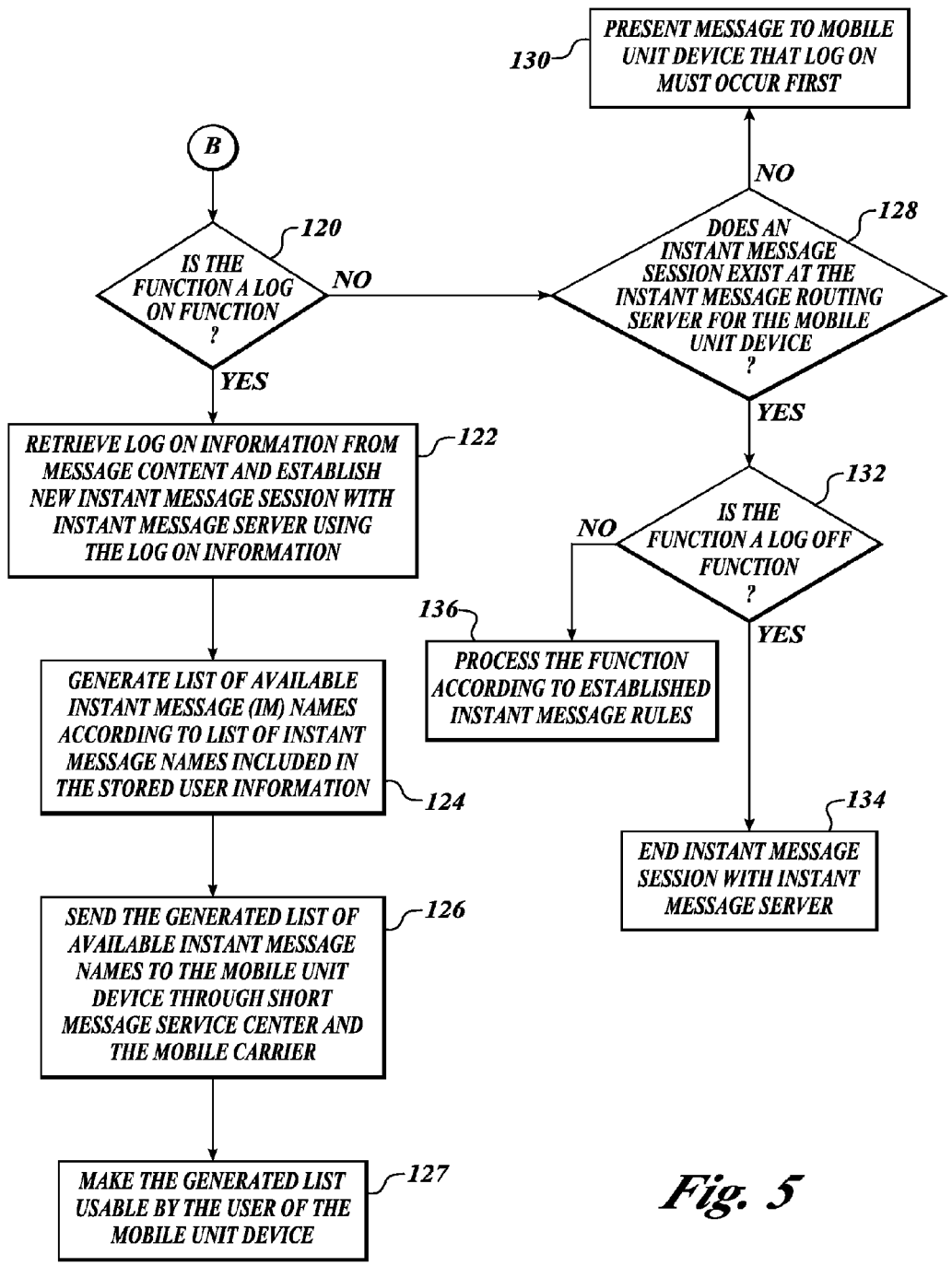

FIG. 5 illustrates the process of processing data received from a mobile unit device 36 that corresponds to an instant message function, from B of FIG. 4. First, at decision block 120, if the function is a sign on function, the instant message routing server 24 establishes a new instant message session with the instant message server 40 for the user associated with the mobile unit device 36 that send the sign on function. The establishment of a new instant message session is done in accordance with the proper password(s) that was included in the message content sent from the mobile unit device 36, block 122. The instant message routing server 24 checks with instant message server 40 to determine which of the names in the instant message name list associated with the user and stored in the database 26 are available or signed on, block 124. This determination of who is available is then sent to the mobile unit device 36 through the short message service center 32 and the mobile carrier 34, block 126. Once the mobile unit device 36 receives the availability determination, the device 36 process it and makes the availability information available for use by the user, block 127.

If the instant message function is not the sign on (sign on) function and if no instant message session is presently active for the user at the instant message routing server 24, decision block 128, a message informing the user that sign on must occur first is presented, block 130. If an instant message session exists and the function is a sign off (sign off) function, decision block 132, the instant message routing server 24 ends the corresponding instant message session, block 134. However, if the function is not the sign off function, the function is processed according to instant message rules, block 136. The following other functions are available: delete; add; and check status. With regards to the delete function, the instant message routing server 24 deletes each instant message name included in the message content from the instant message name list stored with the user's profile information in the database 26. With regards to the add function, the instant message routing server 24 adds each instant message name included in the message content to the instant message name list stored with the user's profile information in the database 26. During instant message session the instant message routing server 24, like an instant message session on a traditional system 42, continually receives connection status information of each instant message name in the instant message name list. With regards to the check status function, the instant message routing server 24 sends the latest received connection status information to the mobile user device 36 through the short message service center 32 and the mobile carrier 34.

Figure 6:
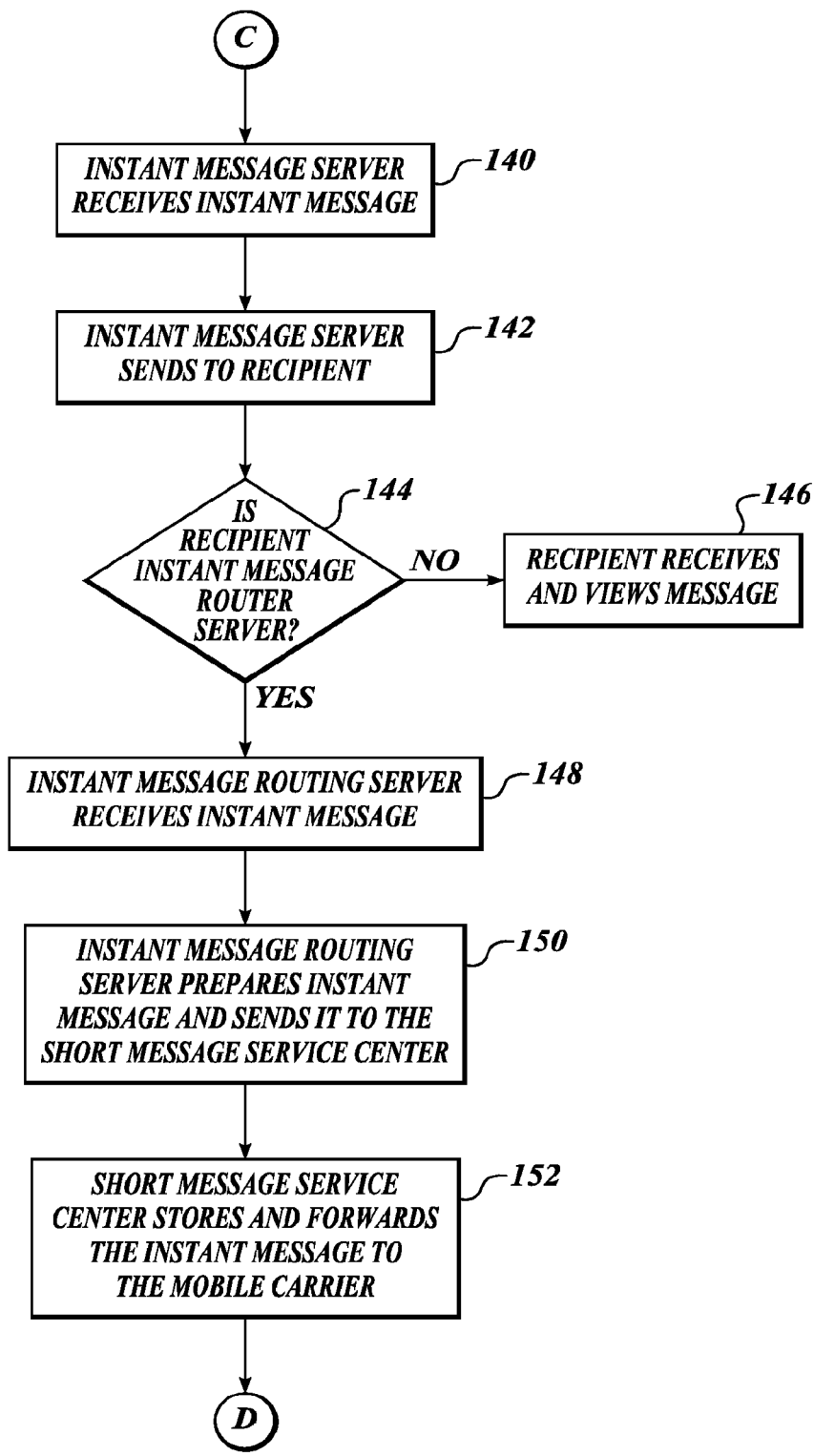
Figure 7:
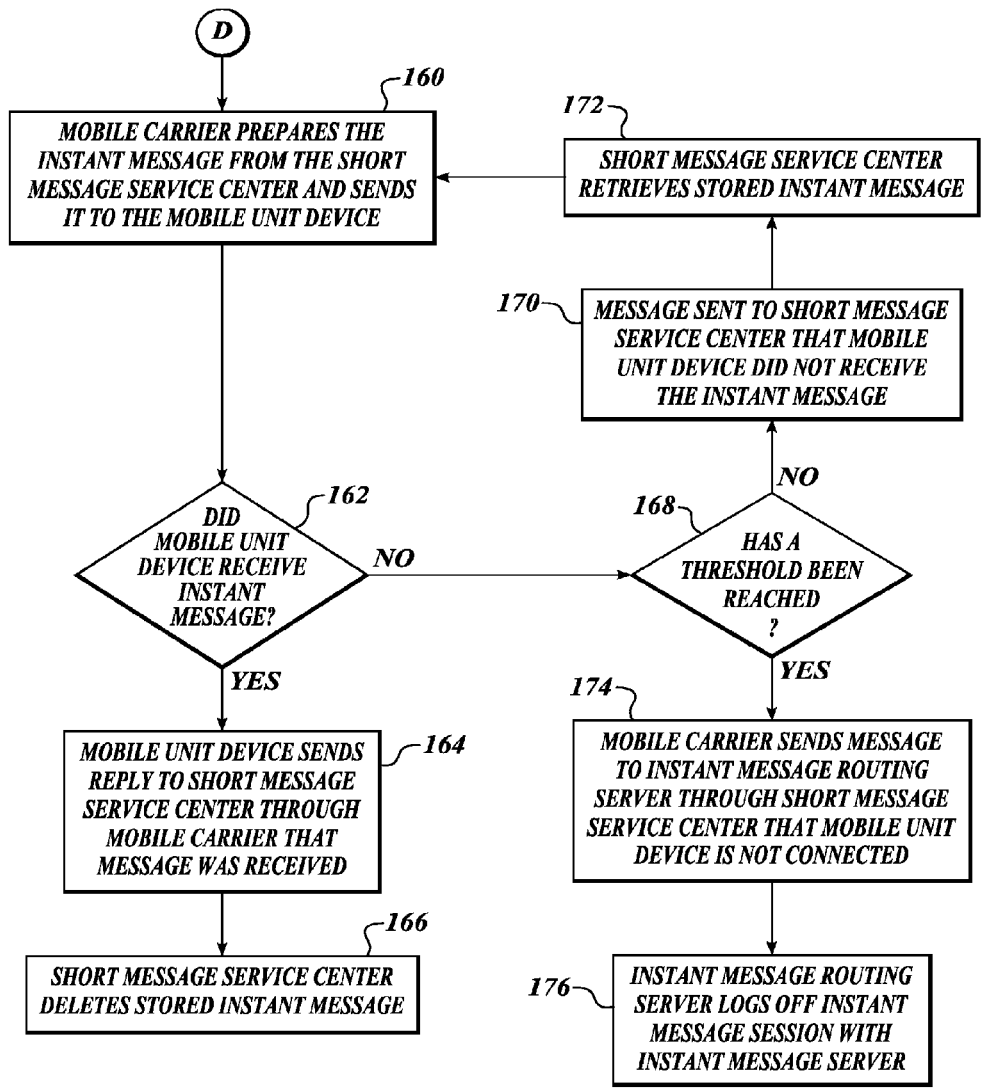

FIGS. 6 and 7 illustrate the process of sending an instant message to a recipient signed on to the instant message service from a mobile unit device 36 through an instant message routing server 24. The process of FIG. 6 occurs when an instant message is sent from another user of a mobile unit device 36, C from FIG. 4, or from a user of a traditional system 42, such as a desktop or laptop computer. First, at block 140, the instant message server 40 receives an instant message and, at block 142, sends it to the signed on recipient identified in the instant message. If, at decision block 144, the recipient is a normal instant message recipient, i.e. not a recipient with an instant message session active through the instant message routing server 24, the recipient receives and views the instant message as per instant message procedures, block 146. If, on the other hand, at decision block 144, the recipient is a user with an instant message session active through the instant message routing server 24, the instant message routing server 24 receives the instant message, block 148. Then, at block 150, the instant message routing server 24 prepares the received instant message according to the predefined protocol and sends the prepared instant message to the short message service center 32, where the short message service center 32 stores and forwards the instant message to the mobile carrier 36 according to the predefined wireless protocol, block 152.

As shown in FIG. 7, at block 160, the mobile carrier 36 prepares the instant message received from the short message service center 32 for transmission and sends the prepared transmission to the mobile unit device 36. If, at decision block 162, the mobile unit device 36 successfully receives the prepared transmission of the instant message, the mobile unit device 36 replies to the short message service center 32 that the transmission was received, block 164. Then, at block 166, the short message service center 32 receives the mobile unit device's successful reply and deletes the stored instant message.

If, however, at decision block 162, the mobile unit device 36 did not successfully receive the prepared transmission of the instant message and if, at decision block 168, a transmission delivery threshold has not been reached, a message is sent to the short message service center 32 that the mobile unit device 36 did not successfully receive the instant message, block 170. This message of unsuccessful reception is sent by the mobile carrier 34. When the short message service center 32 receives a message of unsuccessful reception, the short message service center 32 retrieves the stored instant message that corresponds to the unsuccessfully sent transmission and resends the transmission to the mobile unit device 36 through the mobile carrier 34, blocks 172 and 160.

Again, at decision block 162, if the mobile unit device 36 did not successfully receive the prepared transmission of the instant message and if, at decision block 168, a transmission delivery threshold has been reached, the mobile carrier 34 sends a message to the instant message routing server 24 through the short message service center 32 that the mobile unit device 36 is not connected or not receiving instant messages, block 174. When the instant message routing server receives a message of this type, the instant message routing server 24 signs off or logs off the instant message session associated with the user of the mobile unit device 36 that failed to receive the transmission, block 176. The transmission delivery threshold is preferably a predefined number of delivery attempts. Once the number of attempts have been reached or exceeded, the mobile carrier 34 assumes the mobile user device 36 is off or out of reception range. It can be readily appreciated by those of ordinary skill in the art of cell phone communication, that various data delivery methods can be used for insuring information gets delivered during temporary periods of time when the cell phone is out of communication with the mobile carrier.

Figure 8:
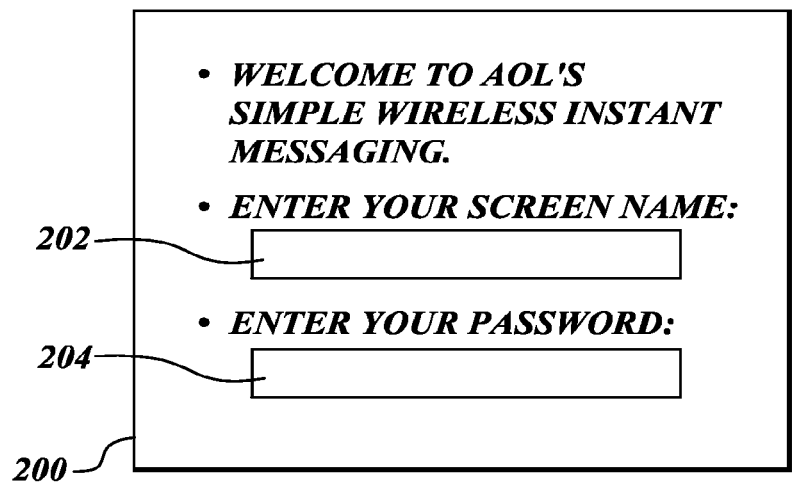
FIGS. 8 and 9 are screen shots of an example user interface for remotely entering instant message names.
Figure 9:
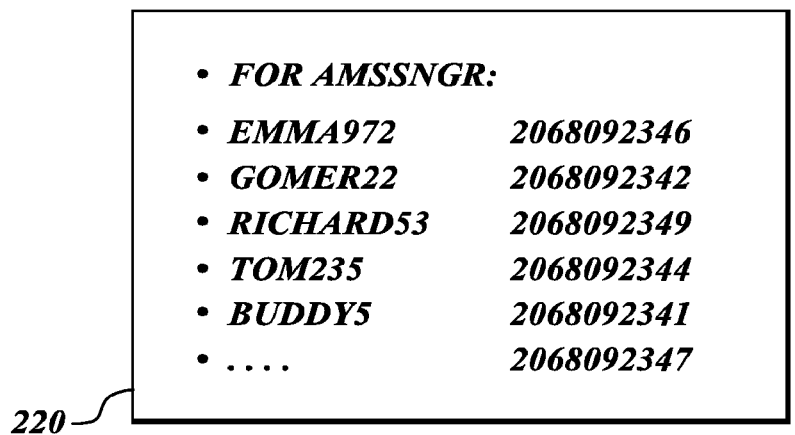

FIGS. 8-14 illustrate example user interfaces used for instant message name list creation (FIG. 2) and for mobile unit device interaction (FIGS. 3-7). As shown in FIG. 8, a wireless instant messaging sign on window 200 includes data fields for entry of the user's screen name 202 and password 204. The user's screen name and password are stored in one of the routing server 24 or the instant message server 40 as a result of a previously performed registration process. After the correct information is entered in the data fields 202 and 204, the user is provided access to various user wireless instant messaging information, such as user account information and an instant message name list interface, as shown in FIG. 9. The wireless instant messaging sign on window 200 is presented on a traditional system 42 that is coupled to the public or private data network 30. The traditional system 42 includes previously loaded software received from either the instant message routing server 24 or the instant message server 40 as a result of the registration process.

As shown in FIG. 9, an instant message name list window 220 is an interface that allows users interaction with the stored instant message name list. Each instant message name in the list corresponds to a phone number assigned to the instant message routing server 24. Through window 220 the user enters, deletes or reorders instant message names based on a comparison with the address book stored in the user's mobile unit device and the user's desired entries. The server 24 or 40 that hosts the window 220 assigns a phone number to each new instant message name entered by the user. The phone numbers assigned are selected from a pool of phone numbers specifically assigned for that purpose. After the user has entered any new instant message names into window 220, the user requests loading of the newly entered instant message names into the user's mobile unit device 36. The server 24 or 40 that hosts the window 220 then generates an instant message name entry executable program that is sent through the short message service center 32 and the mobile carrier 34 to the user's mobile unit device 36. When the user's mobile unit device 36 receives the executable program, the mobile unit device 36 executes the instant message name entry program and loads the newly entered names with corresponding phone numbers into the mobile unit device's address book stored in memory.

Figure 10:
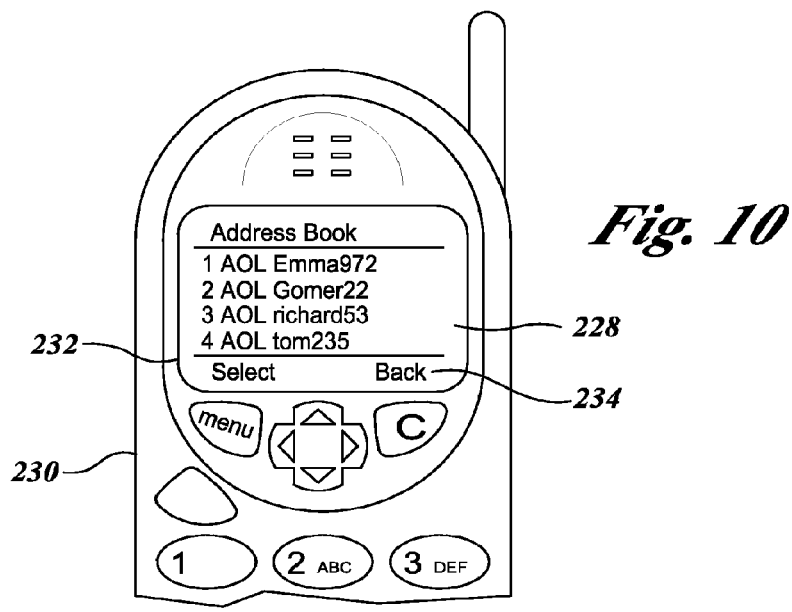
FIGS. 10-14 are diagrams of example user interfaces implemented on a cellular phone.

FIG. 10 shows a mobile unit device 230 with an example first address book user interface (ui) screen 228. The first address book ui screen 228 includes the instant message names stored in the first four locations in the mobile unit device's address book. The mobile unit device 230 includes on-screen and off-screen user interface control features (e.g. touch screen, cursor control, soft function keys). Two examples on-screen user interface control features are a "Select" 232 and a "Back" 234 function displayed at the bottom of the address book ui screen 228. In order for a user to send an instant message, the user selects a create message display screen, enters a text message using the mobile unit device's keypad, such as the T9® enabled keypad produced by Tegic Communications™, and then selects a recipient (an instant message name) from the address book ui screen. User activation of the "Select" function allows the user to select a user identified (e.g. highlighted) instant message name in the name list as the recipient of the entered instant message. User activation of the "Back" function allows the user to view the previously displayed ui screen.

Figure 11:
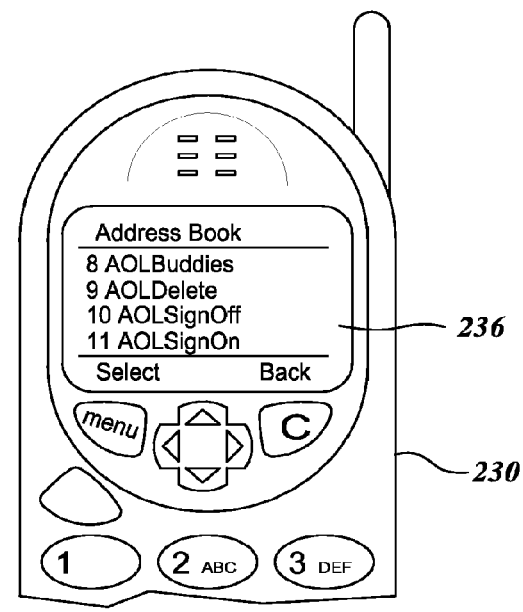
Figure 12:
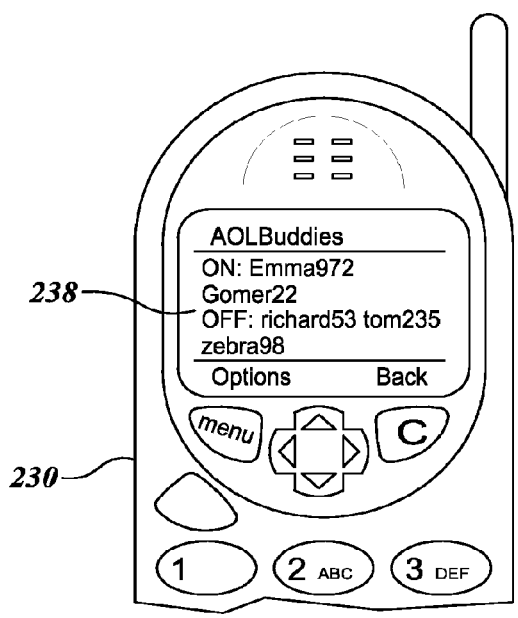
Figure 13:
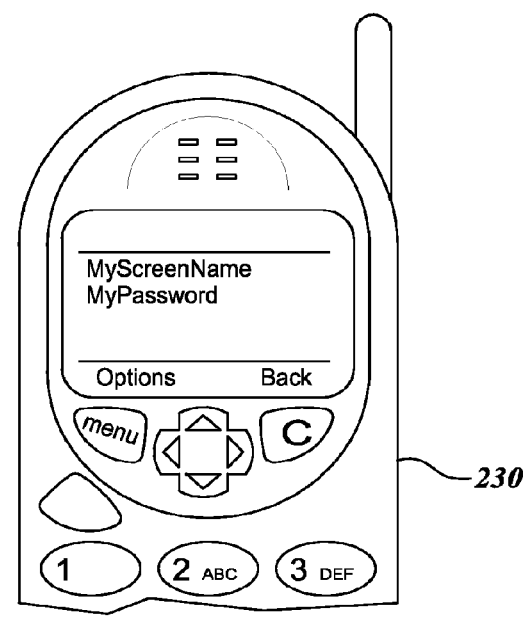

FIG. 11 shows an example second ui screen 236 of the address book. The second ui screen 236 shows address book locations occupied by the following instant message functions: update recipient (instant message name or buddy)

availability; delete a recipient; sign off; sign on. When the user selects and sends the update recipient availability ("Buddies") function with any necessary predefined message content to the instant message routing server 24, the instant message routing server 24 checks availability of recipients (instant message names in the stored instant message name list) and sends the results back to the mobile unit device 230. FIG. 12 shows the results of an executed recipient update on the display of the mobile unit device 230. In display area 238, recipients Emma972 and Gomer22 are indicated as being on-line (i.e. signed on the instant message system). Richard53, tom235 and zebra 98 are indicated as being off-line (i.e. signed off the instant message system).

When the user selects and sends the "Delete" recipient function with the recipient's instant message name in the message content to the instant message routing server 24, the instant message routing server 24 deletes the included instant message name from the user's instant message name list stored in the database 22. Selection of the "SignOff" function commands the instant message routing server 24 to end the instant message session associated with the user. Selection of the "SignOn" function commands the instant message routing server 24 to initiate an instant message session with the instant message server 40 according to screen name and password information sent as message content to the instant message routing server 24, see FIG. 13. The "SignOn" function message content can be saved at the mobile unit device and reused for subsequent sign on requests. Alternatively, the instant message routing server 24 stores the user's instant message screen name and password and the phone number of the user's mobile unit device 36 to aid with automatic sign on.

Figure 14:
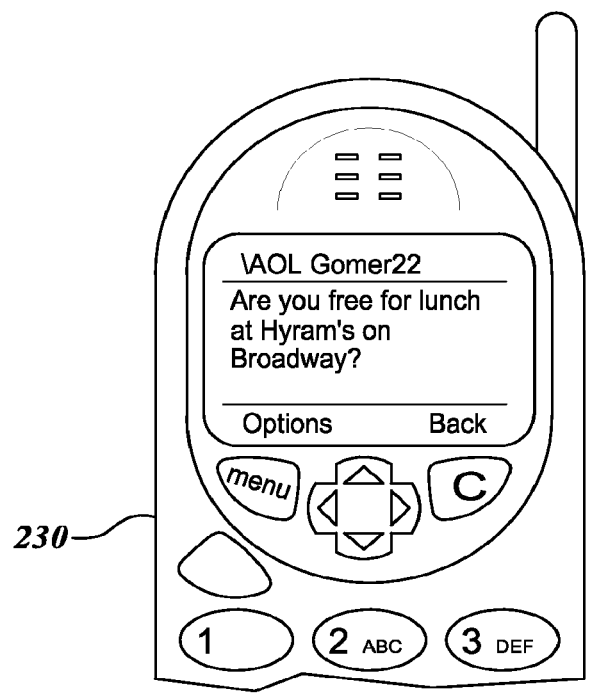

FIG. 14 shows how a received message appears on the mobile unit device 230. The message content of the received message is displayed with the instant message name of the originator of the received message.

As can be readily appreciated by those of ordinary skill in the art, the functions performed by the routing system 22 may be combined with the instant message server 40 or the short message service center 32. The short message service center 40 may be included in the mobile carrier infrastructure. Also, the functions of the components of the present invention may be distributed to multiple servers across one or more of the included networks.

While the presently preferred embodiment of the invention has been illustrated and described, it will be appreciated that various changes can be made therein without departing from the spirit and scope of the invention.

We claim that:

1. A method comprising:
   receiving, at a server, an electronic message of a first type directed to a user account associated with a user;
   determining, by the server, that at least a portion of the electronic message of the first type is to be reformatted into a second type of electronic message, wherein the determination is made based on one or more of metadata included with the electronic message of the first type or conditions of a communications network;
   in response to the determination, reformatting, by the server, the at least a portion of the electronic message of the first type into an electronic message of the second type; and
   sending, by the server, the electronic message of the second type including the reformatted at least a portion of the electronic message of the first type to the user account.

2. The method of claim 1, wherein the metadata included with the electronic message of the first type comprises address data associated the second type of electronic message.

3. The method of claim 1, wherein reformatting the at least a portion of the electronic message of the first type comprises formatting the electronic message of the first type in accordance with a protocol used to communicate the second type of electronic message.

4. The method of claim 3, further comprising sending the electronic message of the second type from a short message service center to an instant message routing server.

5. The method of claim 1, further comprising:
   determining that the user is not signed on to a communications system; and
   storing the electronic message of the first type until the user signs on to the communication system.

6. The method of claim 5, further comprising:
   detecting that the user has signed on to the communications system; and
   sending, to the user account, the electronic message of the second type in response to detecting that the user has signed on to the communications system.

7. The method of claim 1, further comprising:
   determining that the user is not signed on to a communications system; and
   forwarding the electronic message of the first type to an e-mail address associated with the user.

8. The method of claim 7, wherein the communication system comprises an instant message system.

9. The method of claim 1, wherein the metadata included with the electronic message of the first type comprises an indicator corresponding to a server associated with the second type of electronic message.

10. The method of claim 1, wherein the second type of electronic message comprises an instant message.

11. The method of claim 10, wherein the electronic message of the first thype comprises a text message.

12. The method of claim 1, wherein determining that the at least a portion of the electronic message of the first type is to be reformatted into the electronic message of the second type comprises:
   determining that the communications network associated with the electronic message of the first type is unavailable.

13. A system comprising:
   at least one processor; and
   at least one non-transitory computer readable storage medium storing instructions thereon that, when executed by the at least one processor, cause the system to:
   receive an electronic message of a first type directed to a user account associated with a user;
   determine that at least a portion of the electronic message of the first type is to be reformatted into a second type of electronic message, wherein the determination is made based on one or more metadata included with the electronic message or conditions of a communications network;
   in response to the determination, reformat the at least a portion of the electronic message of the first type into an electronic message of the second type; and
   send the electronic message of the second type including the reformatted at least a portion of the electronic message of the first type to the user account.

14. The system of claim 13, further comprising instructions that, when executed by the at least one processor, cause the system to:
  compare a destination identifier in the electronic message of the first type to a look-up table associated with the user account; and
  determine how to send the electronic message of the second type to the user account based upon the comparison.

15. The system of claim 13, further comprising instructions that, when executed by the at least one processor, cause the system to:
  identify address information in the electronic message of the first type; and
  forward the electronic message of the first type to a short message service center based on the address information.

16. The system of claim 13, further comprising instructions that, when executed by the at least one processor, cause the system to determine whether the user account is capable of receiving the electronic message of the second type at a mobile device associated with the user account.

17. The system of claim 13, further comprising instructions that, when executed by the at least one processor, cause the system to:
  determine that the user is not signed on to a communications system; and
  store the electronic message of the first type until the user signs on to the communication system.

18. The system of claim 17, further comprising instructions that, when executed by the at least one processor, cause the system to:
  detect that the user has signed on to the communications system; and
  send, to the user, the electronic message of the second type in response to detecting that the user has signed on to the communications system.

19. The system of claim 13, wherein the metadata included with the electronic message of the first type comprises address data associated with a destination for the electronic message of the first type.

20. The system of claim 19, wherein the reformatting comprises repackaging the at least a portion of the electronic message of the first type for compatibility with a different communications network.

* * * * *